(12) United States Patent
Morishima (10) Patent No.: US 8,110,946 B2
(45) Date of Patent: Feb. 7, 2012

(54) UNINTERRUPTIBLE POWER SUPPLY

(75) Inventor: Yoichi Morishima, Houston, TX (US)

(73) Assignee: Toshiba International Corporation, Houston, TX (US)

(*) Notice: Subject to any disclaimer, the term of this patent is extended or adjusted under 35 U.S.C. 154(b) by 298 days.

(21) Appl. No.: 12/615,743

(22) Filed: Nov. 10, 2009

(65) Prior Publication Data

US 2011/0109161 A1    May 12, 2011

(51) Int. Cl.
*H02J 9/00* (2006.01)
(52) U.S. Cl. .......................................... 307/64
(58) Field of Classification Search .............. 307/64
See application file for complete search history.

(56) References Cited

U.S. PATENT DOCUMENTS

6,630,752 B2 * 10/2003 Fleming et al. ................. 307/64
* cited by examiner

*Primary Examiner* — Robert L. Deberadinis
(74) *Attorney, Agent, or Firm* — Westerman, Hattori, Daniels & Adrian, LLP (57) ABSTRACT

An uninterruptible power supply with an input terminal and an output terminal, a main switch connected to the input terminal, an input filter circuit connected to the main switch, a rectifier circuit connected to the input filter circuit, a main capacitor connected to the rectifier circuit, a switching device connected to the capacitor and the output terminal, a voltage boost circuit connected to the capacitor and a battery input terminal, a slope control circuit connected to the voltage boost circuit, a slope selection circuit connected to the slope control circuit, and a control board connected to the slope selection circuit, where the control board has a central processing unit and memory.

11 Claims, 10 Drawing Sheets

UNINTERRUPTIBLE POWER SUPPLY

FIELD OF THE INVENTION

The present disclosure relates to power supplies for electronic devices. More particularly, the present disclosure relates to an uninterruptible power supply to provide power to critical equipment.

BACKGROUND

The following description sets forth the inventor's knowledge of related art and problems therein and should not be construed as an admission of knowledge in the prior art.

Uninterruptible power supplies (UPSs) provide power to critical equipment that cannot experience any break in service. In other words, a UPS is used in circumstances where even a short duration brownout or blackout is unacceptable. Examples of such critical equipment include computer servers, computer networks, telecommunication electronics, medical devices, security networks, and the like. An uninterruptable power supply makes regulated power available to the critical equipment regardless of the status of the power supply from the power grid.

Figure 1:
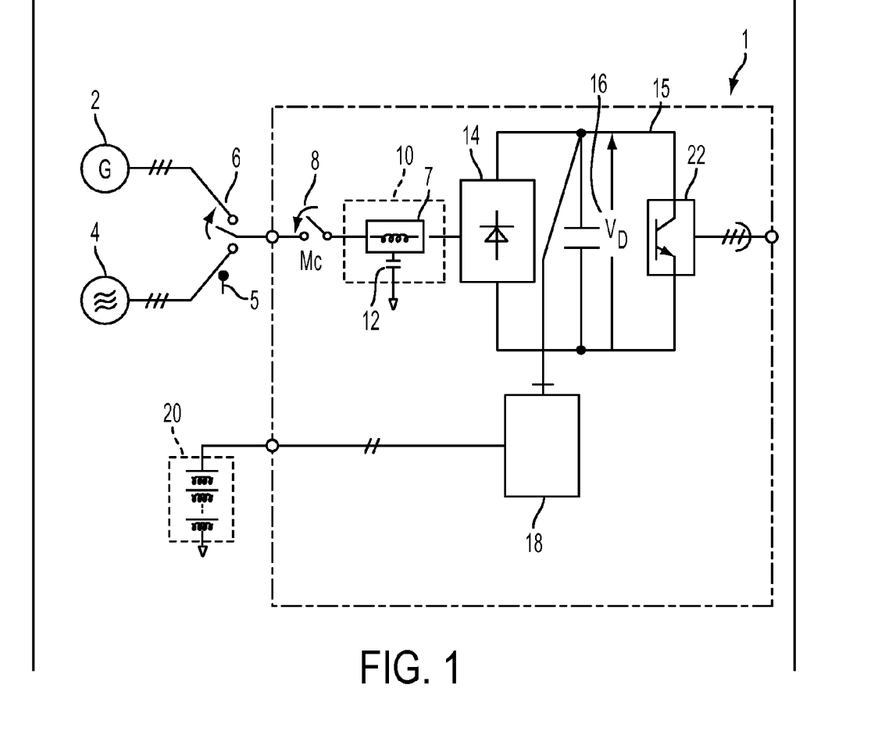
FIG. 1 is a schematic of the power electronics of a conventional uninterruptable power supply.

FIG. 1 shows a schematic of a conventional uninterruptable power supply. The UPS system consists of main input switch 8, input filter circuit 10, rectifier circuit 14, main capacitor module 16, voltage boost circuit 18 and output inverter module 22. The input filter circuit 10 includes a current filter 7 and a filter capacitor 12.

To increase the redundancy of the power system, a generator 2 can also be connected to the UPS during power failures. Normally switching between commercial power 4 and generator 2 will be performed by a mechanical switch 6. During the time interval from when commercial power is lost, until switching to generator power, the UPS will supply power by using a series of batteries 20. Normally when running on battery power, the voltage supplied to power bus 15 is boosted up using voltage boost up circuit 18. The voltage boost up circuit 18 controls the DC bus voltage (Vdc) during battery backup mode, as described below.

When the UPS is in an AC line mode, either from the power grid or the generator, the power bus voltage Vdc is normally decided by commutation from the AC input power. For example, in the case of a 480V bus voltage, the corresponding AC power is 680V; (680V/√2=480V, nominal voltage).

When in the battery backup mode, the voltage boost circuit will raise up the DC power bus 15 voltage from the battery voltage. The bus voltage is usually raised to a value lower than nominal voltage due to economical reasons regarding battery usage. However, if the commercial power is out for an extended period of time, it is impractical to use only battery power as there is not enough energy stored in the batteries 20. Thus, the UPS will switch from battery power to generator power.

When switching from battery backup mode to AC line mode, the power bus 18 voltage will be boosted up to a level higher than the nominal level. Voltage boost circuit 18 will stop boosting after switching to AC mode.

However, a problem occurs with the conventional UPS. During the switching of power from the battery to AC line power, there is a high current flow due to the potential difference between the AC line's commutated voltage and the DC power bus 15 voltage. Especially in the case where a generator is connected to the AC input line and supplies AC power to the UPS, this current may become large due to the oscillation by the generator's internal impedance (inductance) and input filtering capacitor. This high current may cause instability in the output voltage of the generator. If this happens, the UPS may detect this unstable voltage and/or current, and move to battery backup mode again. The operation of the convention UPS will be explained in greater detail below with respect to FIG. 2

Figure 2:
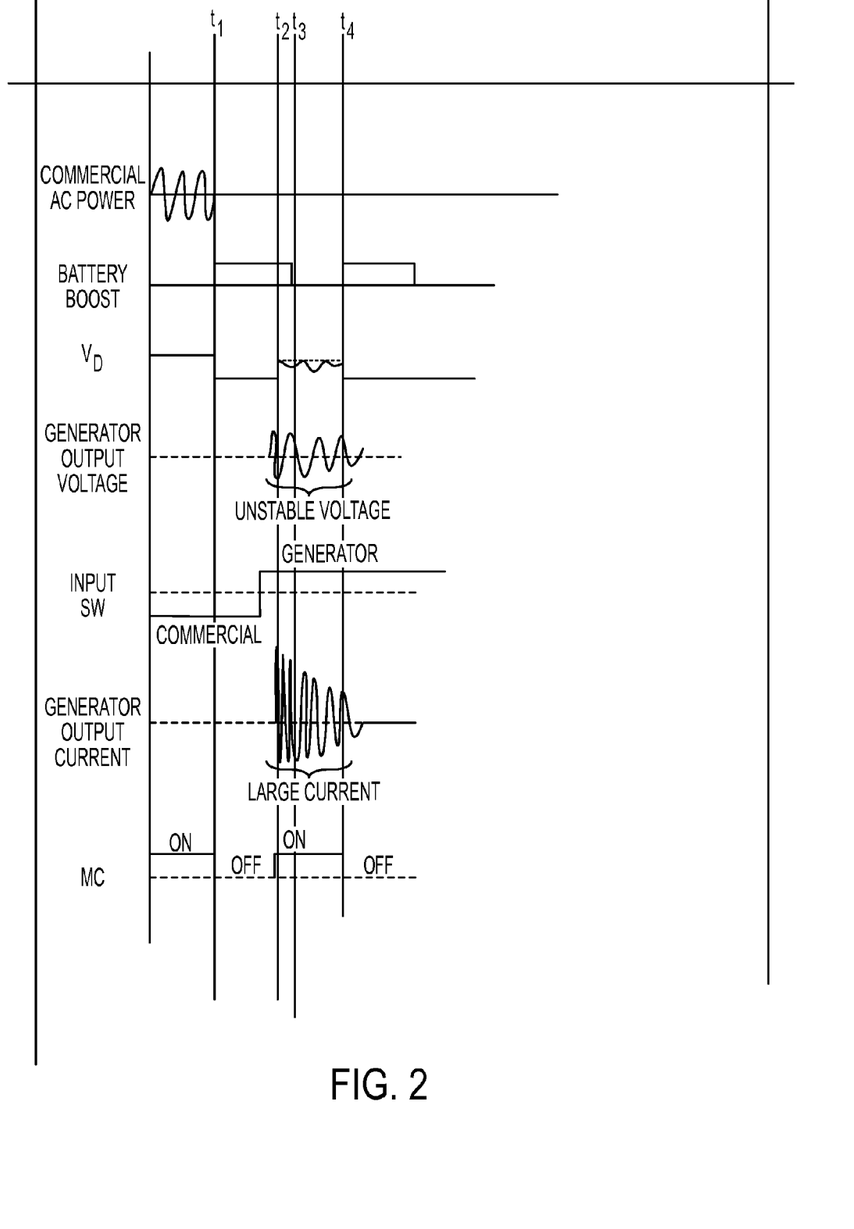
FIG. 2 is a timing diagram of currents, voltages and switches according to a conventional uninterruptable power supply.

FIG. 2 is a timing diagram showing currents, voltages and switches according to the conventional UPS design as shown in FIG. 1. At time t<$t_1$, switching element 8 is closed. That is, switching element 8 is conducting current, allowing current to flow from the commercial power grid 4 to the UPS 1.

As shown at time $t_1$, commercial AC power is lost and battery power immediately takes over in powering the UPS 1. The voltage from batteries 20 is boosted by voltage boost circuit 18. Once commercial AC power is lost, generator 2 turns on and begins to power up. After a certain time from the time AC power is lost, and once generator 2 has come up to full power and has stabilized, at time $t_1$<t<$t_2$, input switch 6 switches from commercial AC power to generator 2 power.

Then at time $t_2$, switching element 8 closes and allows current from the generator 2 to flow into UPS 1. Concurrently, battery power and voltage boost circuit 18 are switched off in order to get power from the generator 2. As shown in FIG. 2, the generator output voltage oscillates wildly, causing the bus voltage to oscillate as well. This oscillation is due to the resonance created when the high input voltage of the generator 2 is connected to the lower voltage of the power bus 15, powered by voltage boost circuit 18 and batteries 20.

That is, the inrush current caused by the sudden change from the battery boost circuit to generator power overwhelms the generator 2's power output capabilities. The generator 2 cannot supply such a large current at such a high voltage. As such, the voltage of the generator 2 has a sudden drop. This leads to an oscillatory effect which can damage the generator.

As shown in FIG. 2, the generator output voltage and output current oscillate wildly. Main switch 8 will open because the sudden drop in voltage from the generator 2, appears to the UPS control circuitry to be a power failure. Thus, as shown at time $t_4$, the main switch opens and the bus is again powered by voltage boost circuit 18 and batteries 20.

Thus, in the case where an inrush current from the generator 2 to the UPS 1 is too great, the mode change between AC line mode and battery backup mode repeats and additional battery power is consumed.

SUMMARY

According to one embodiment of the invention, the aforementioned problems of the convention UPS are sought to be corrected. That is, when transitioning between battery power and generator power, it is desirable to have a smooth transition so that the bus voltage does not oscillate and cause the UPS control circuitry to sense a power failure and switch back to battery power.

One embodiment of an uninterruptable power supply comprises an input terminal and an output terminal, a main switch connected to the input terminal, an input filter circuit connected to the main switch, a rectifier circuit connected to the input filter circuit, a main capacitor connected to the rectifier circuit, a switching device connected to the capacitor and the output terminal, a voltage boost circuit connected to the capacitor and a battery input terminal, a slope control circuit connected to the voltage boost circuit, a slope selection circuit connected to the slope control circuit, and a control board connected to the slope selection circuit, wherein the control board has a central processing unit and memory.

BRIEF DESCRIPTION OF THE FIGURES

The above and other features and advantages of embodiments of the present invention will become more apparent by describing in detail exemplary embodiments thereof with reference to the attached drawings in which.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 3:
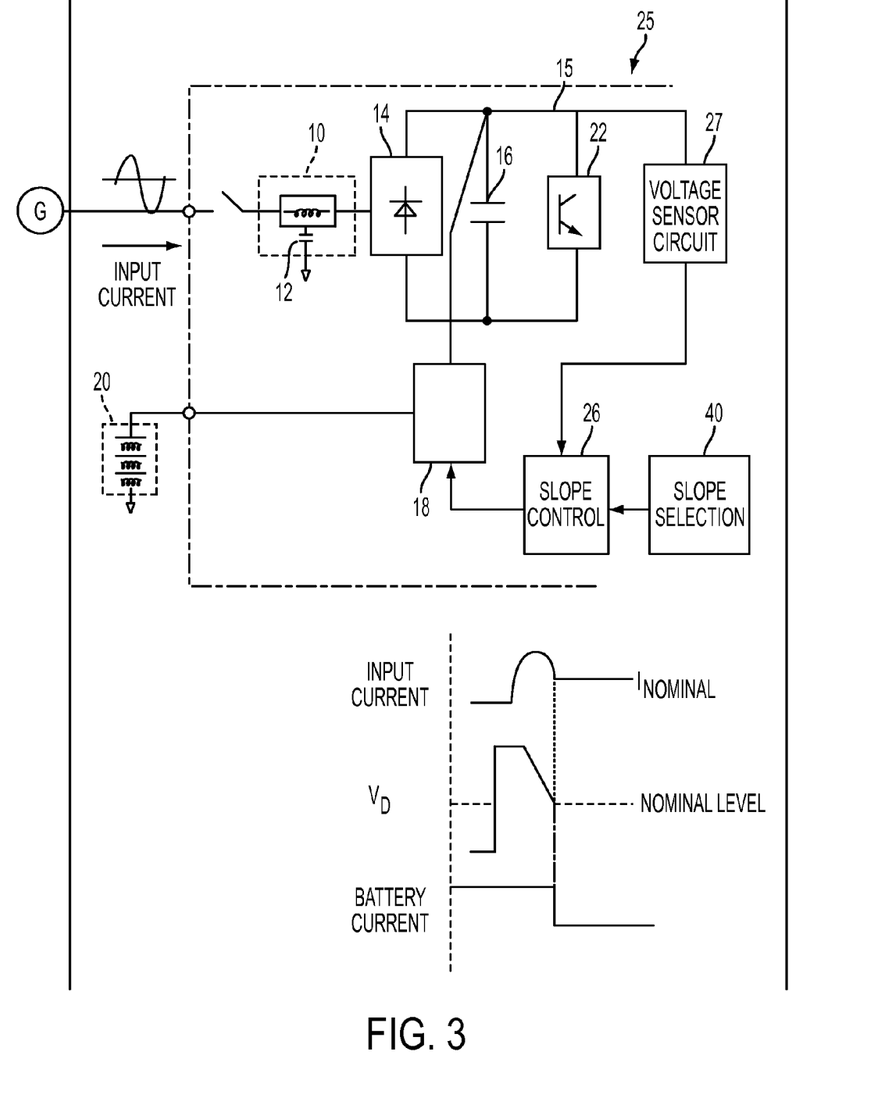
FIG. 3 is a circuit level schematic of the power electronics of an uninterruptable power supply according to a first embodiment.

FIG. 3 shows a first embodiment of the uninterruptable power supply. The UPS 25, as shown in FIG. 3 comprises a main switch 8 for allowing input power to be received from an alternating current source, such as commercial power from the power grid, or generator power from a generator. This switch can be either a mechanical switch or a solid state switch.

The main switch 8 is connected to an input filter circuit 10, which includes for example, a filter capacitor 12. The input filter receives the alternating power from the power grid or the generator and filters the power to ensure that there are no power spikes or lulls in the power signal sent to the rectifier circuit 14. Input voltage from the power grid or the generator can be, for example, 100V to 700V and is typically from 200V to 600V.

The rectifier circuit 14 receives the alternating power from the filter circuit 10 and supplies a regulated DC power source to the power bus 15. The power bus voltage can be, for example, $480V \times \sqrt{2} = 680V$. This regulated DC power can then be switched through a switching circuit 22 and used for the desired application.

A main capacitor 16 is used to hold up the voltage of power bus 15 during switching from battery power to AC power or during periods of power use.

A voltage boost circuit 18 is connected to the power bus and is also connected to batteries 20. The voltage boost circuit 18 increases the battery voltage so that the batteries 20 can be used to partially or fully supplement the power bus voltage 15. As shown in FIG. 3, a slope selection circuit 40 is connected to a slope control unit 26 which is connected to the input of voltage boost circuit 18.

Capacitor 16 is primarily used to hold up the voltage and supply energy to the critical devices during normal operation and for brief periods during transient time. For example, when power is being switched from batteries 20 to generator 2, there is a period of several milliseconds where the UPS 25 is not being supplied power. Capacitor 16 is able to store energy and hold the voltage of the power bus 15 up during the transitioning from one power source to another during transient time.

Slope selection circuit 40 is used to select the desired power bus 15 voltage reduction slope, when transitioning from battery power to generator power. Slope control circuit 26 receives the desired power bus 15 voltage from slope selection circuit 40. Slope control circuit 26 also receives the power bus 15 voltage from voltage sensor circuit 27 as a feed back signal. Slope control circuit 26 receives these two inputs and determines the proper voltage setting during the transition of power from the batteries 20 to the generator 2. Slope control circuit 26 then inputs this desired power bus 15 voltage to voltage boost circuit 18. Voltage boost circuit 18 then outputs the proper voltage to power bus 15.

The role of each component in the UPS will become more apparent as the embodiment is discussed further.

Figure 5:
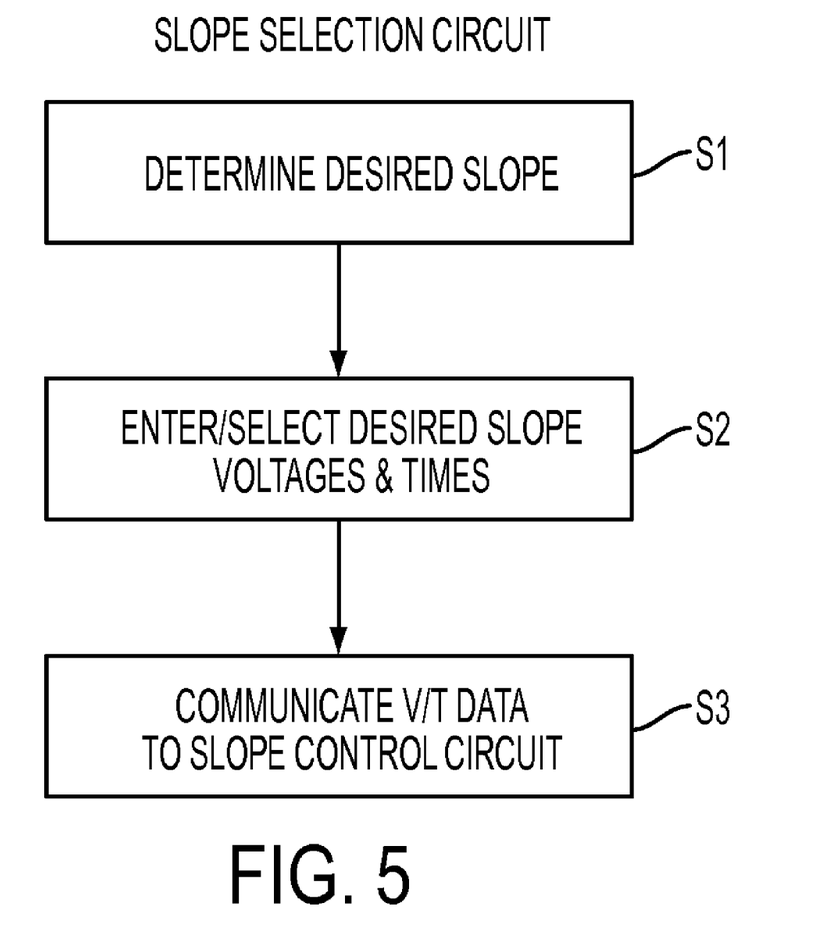
FIG. 5 is a flowchart showing the operation of a slope selection circuit according to the first embodiment.

FIG. 5 is a flowchart of a slope selection circuit, slope selection process. The first step is to determine the appropriate slope of the power bus 15 voltage. For example, the user of the UPS may want the generator 4 to turn on as quickly as possible when switching from battery to generator power. As such, a steep voltage/time slope may be chosen for the power bus 15.

If the user desires a slower transition from battery to generator power, then a more gradual slope of voltage/time may be chosen. A linear slope or an exponential slope such as $x^{-2}$, or any other appropriate slope may also be chosen in accordance with this embodiment.

Figure 4:
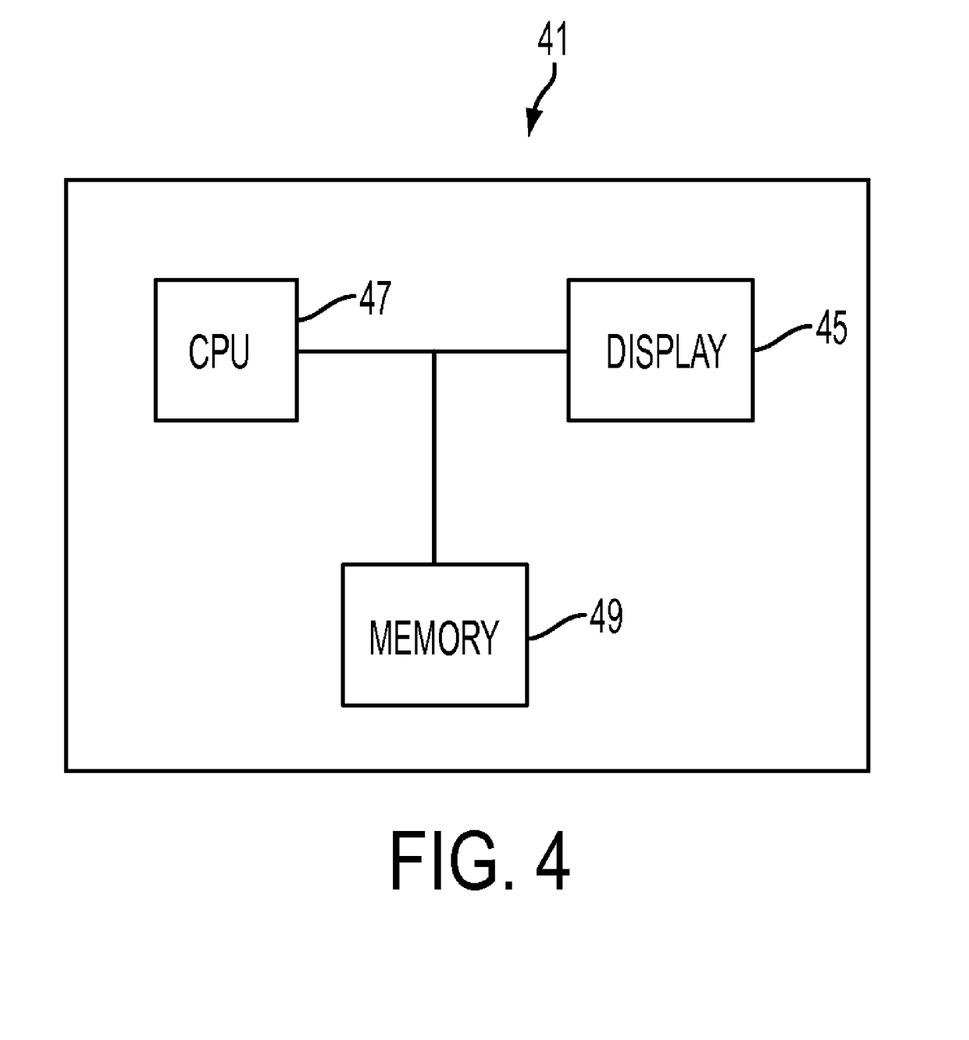
FIG. 4 is a schematic of an uninterruptible power supply system according to a first embodiment.

Once a desired slope is determined in step 1, the slope must be entered into the slope selection circuit. A particular slope may be entered on a point and by point basis, inputting voltage and time coordinates individually, or may be more quickly entered by selecting a pre-created slope stored in the memory 49 of the slope selection circuit as shown in FIG. 4. The slope selection circuit can be implemented using software on a CPU 47, located on a circuit board in the UPS. The slope selection circuit can also be implemented using hardware on a circuit board in the UPS. The slope selection circuit can also be implemented using a separate computer. The slope can be entered on a computer, using a mouse or keyboard. The above components comprise a UPS system 41.

A user may select the data by using an external communication device in entering in the desired slope to the slope selection circuit. Further, the slope selection circuit and slope control circuit can be located on a control board contained in the UPS 25. The slope control circuit and slope selection circuit can be implemented by either hardware, located on the control board in the UPS 25, or can be implemented by software, executed by the CPU 47 on the control board. Further, the pertinent information entered and pertaining to the slope selection circuit can also displayed on a monitor 42 or display 45, as shown in FIG. 4.

Figure 6:
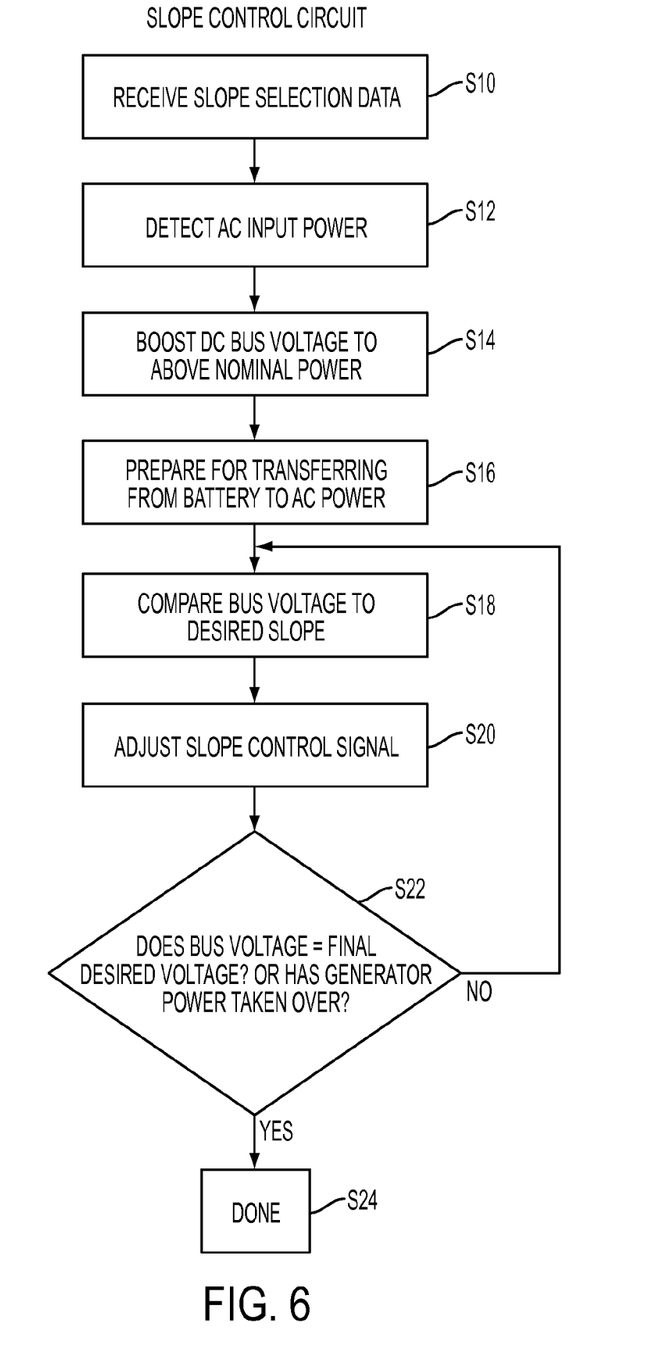
FIG. 6 is a flowchart showing the operation of a slope control circuit according to the first embodiment.

Once a slope has been entered into UPS system 41, the slope data can be relayed to the slope control circuit, as shown in step 3. The algorithm for the slope control circuit is shown for example, in FIG. 6. As shown in FIG. 6, the slope control circuit receives the slope selection data from the slope selection circuit, as previously discussed with respect to step 3 of FIG. 5.

Upon receiving the slope selection data, the slope control circuit waits until recovery power from generator 2 or power grid 4 is detected and ready to be input into UPS 25, in step 12. Once AC power is detected, the voltage boost circuit 18 boosts the voltage of the power bus 15 from below the nominal voltage to above the nominal voltage, as shown in step 14. Recall from above that when operating on battery power, the voltage of the bus is usually lowered in order to conserve energy.

The power bus 15 voltage is boosted during this transition time in order to help ensure a smooth transition of power from batteries 20 to AC power, specifically, generator 2 power. That is, if battery power, operating at below a nominal voltage was simply switched to AC power, operating at nominal voltage, then there could be a large inrush of current due to the voltage difference between the generator voltage, operating at nominal power, and battery voltage, operating below nominal power. This could damage the generator 2 or damage the UPS itself.

Once the power bus 15 voltage has been increased to a voltage greater than a nominal value, the voltage is held at this level for a specified period of time, according to the slope selection data, as shown in step 16.

At step S18, the power bus 15 voltage from the voltage sensor circuit 27 is compared to the power bus 15 voltage of the slope selection data. The slope control circuit 26 determines if the power bus 15 voltage is too high or too low with respect to the desired voltage, as indicated in the slope selection data input by the slope selection circuit 40.

If the power bus 15 voltage is too high, the slope control circuit 26 will send a control signal to the voltage boost circuit 18, instructing the voltage boost circuit 18 to lower the power bus 15 voltage, as shown in step 20. If the power bus 15 voltage is too low, the slope control circuit 26 will send a control signal to the voltage boost circuit 18, instructing the voltage boost circuit 18 to increase the power bus 15 voltage, as shown in step 20.

Thus, the power bus 15 voltage will closely match the selected slope of the voltage as inputted in the slope selection circuit 40, until the power bus 15 voltage reaches the final desired voltage as inputted in the slope selection circuit 40 or until generator 2 has taken over powering UPS 25. At this time, the function of the slope control circuit 26 will be complete, as shown in step 24.

Figure 7:
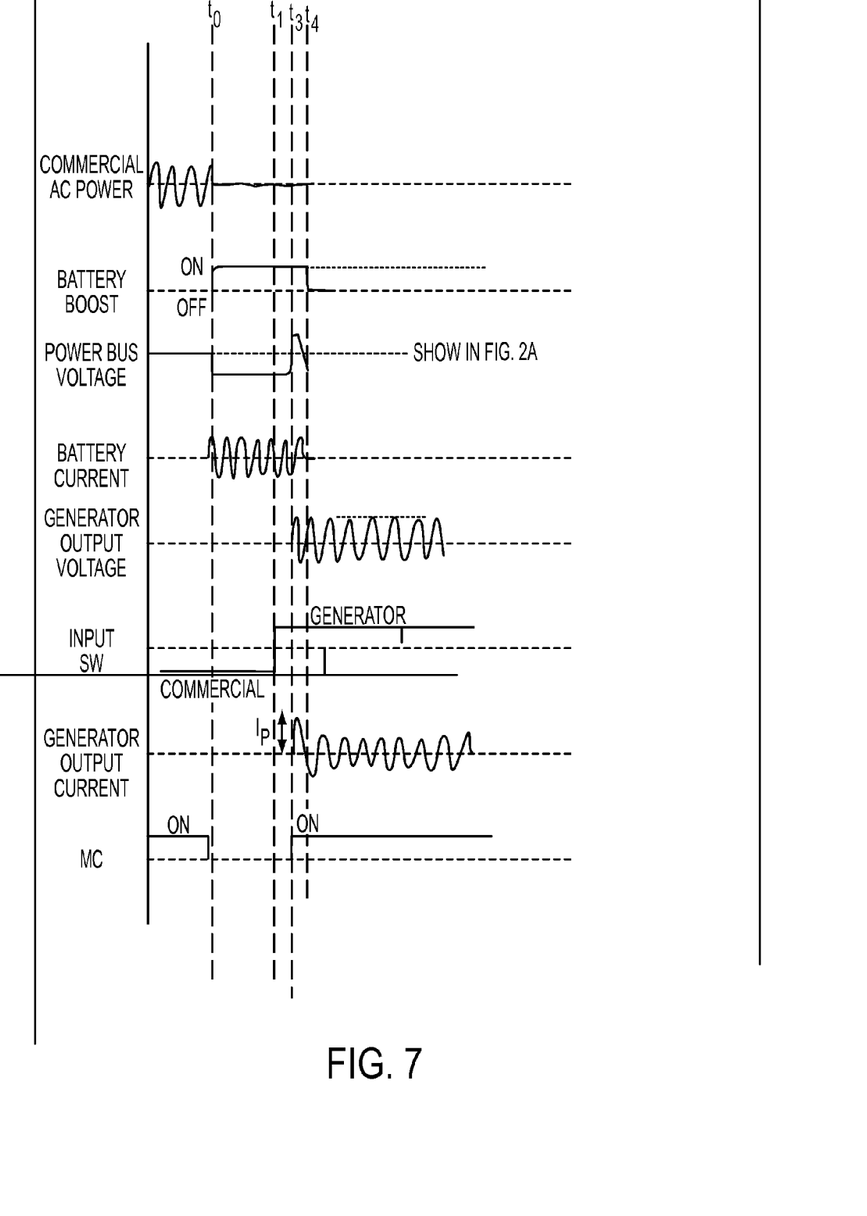
FIG. 7 is a timing diagram of currents, voltages and switches according to the first embodiment.

FIG. 7 is a timing chart showing various signals of the UPS 25 during a transition from battery power to generator power. As shown in FIG. 7, when $t<t_0$, commercial power 4 is being supplied to UPS 25, the main switch 8 is closed, allowing the power from the power grid 4 to enter the UPS. Power from the power grid is usually 3 phase power, but is not limited to this and can be 1 phase power, etc.

At time $t_0$, commercial AC power from power grid 4 is lost. Main switch 8 opens in order to protect the UPS 25, and batteries 20 immediately begin to supply power to the power bus 15. Batteries 20 can be diode-OR'd to the power bus 20 through voltage boost circuit 18. Concurrently, voltage boost circuit 18 immediately begins to boost the voltage of batteries 20 and supply the power bus 15 with minimum voltage in order to keep a good output voltage (less than nominal voltage).

Nominal voltage on the power bus 15 is approximately 670V for example, but the voltage provided by batteries 20 and voltage boost circuit 18 can be less, in order to reduce power consumption and increase the amount of time the batteries can provide power.

At time $t_0<t<t_2$, power on the power bus 15 is only a minimum voltage. Voltage sensor circuit 27 senses the power bus 15 voltage and sends a signal to the control circuitry. The control circuitry then instructs generator 2 to turn on. Thus, the generator 2 can automatically turn on when the voltage of the power bus 15 drops below a threshold voltage. In the present example, the generator turns on when the voltage on power bus 15 is lower than nominal voltage $V_{DC}$. It usually takes several minutes for the generator 2 to reach full power and have a stabilized output voltage. Full power for generator 2 is for example, $480V_{AC}$, or the nominal voltage of power bus 15, $(480V_{AC})*(\sqrt{2})=680V_{DC}$.

Once the output voltage from generator 2 has stabilized at time $t_2$, input switch 6 switches from commercial power 4 to generator power 2. Upon detecting the recovery power from the generator 2, the voltage boost circuit 18 boosts the voltage of power bus 15 to above the nominal voltage of $670V_{DC}$. This ensures that when main switch 8 is closed, there is not any in-rush current from generator 2 which could harm the UPS 25 and the generator 2.

Once the voltage of the power bus 15 is boosted to above a nominal level, then at time $t_2$, main switch 8 is closed, allowing the generator to be connected to the UPS 25. However, even though the generator 2 is connected to UPS 25, the generator 2 still is not powering the UPS. This is because the power bus voltage 15 has been boosted to above the voltage outputted by the generator 2. Only when the voltage on power bus 15 falls to below the output voltage of generator 2, will the generator 2 power the UPS.

At time $t_3<t<t_4$, the voltage boost circuit 18 will slowly lower the power bus 15 voltage according to the slope control signal output by the slope control circuit 26. That is, as discussed above with respect to FIG. 5, the slope control circuit will compare the power bus 15 voltage to the desired slope, selected on the slope selection circuit, and output a slope control signal.

This slope control signal instructs the voltage boost circuit to increase or decrease the voltage on power bus 15. As the voltage of power bus 15 slowly decreases toward and reaches the nominal voltage, power from the generator 2 will smoothly transition to power bus 15, and will overtake the batteries 20 in powering the UPS. Once the generator 20 takes over in powering the UPS, the voltage boost circuit can stop and energy from the batteries will no longer be used.

At time $t_4$, voltage boost circuit 18 stops and battery current stops flowing from batteries 20. At this point, generator 2 is fully powering the UPS 25. Power has transitioned smoothly from battery power to generator power.

Figure 8:
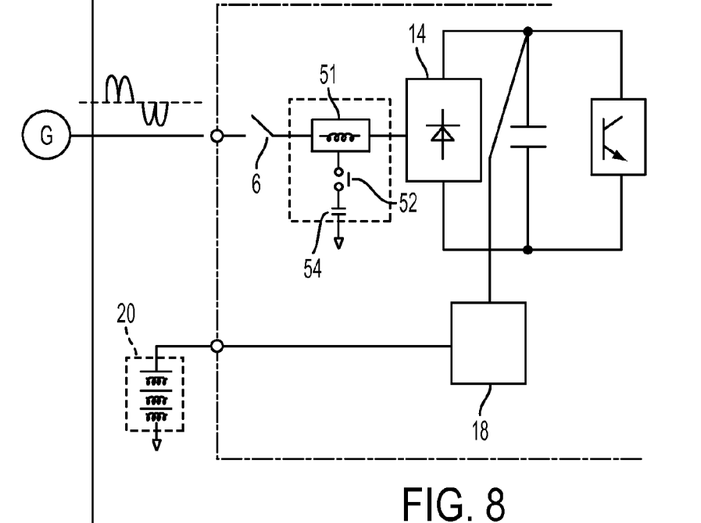
FIG. 8 is a schematic of the power electronics of an uninterruptable power supply according to a second embodiment.

FIG. 8 shows a second embodiment of the uninterruptable power supply. For the components of FIG. 8 which are shared with FIGS. 1 and 2, please see the discussion above. Input filter circuit 5 comprises a current filter circuit 7, a filter capacitor 54 and a switching element 52. In the case where generator 2 is supplying power to the UPS, by opening and closing switching element 52, filter capacitor 54 can be isolated.

By using this method, the oscillation between generator impedance and filter capacitor may be protected.

Figure 9:
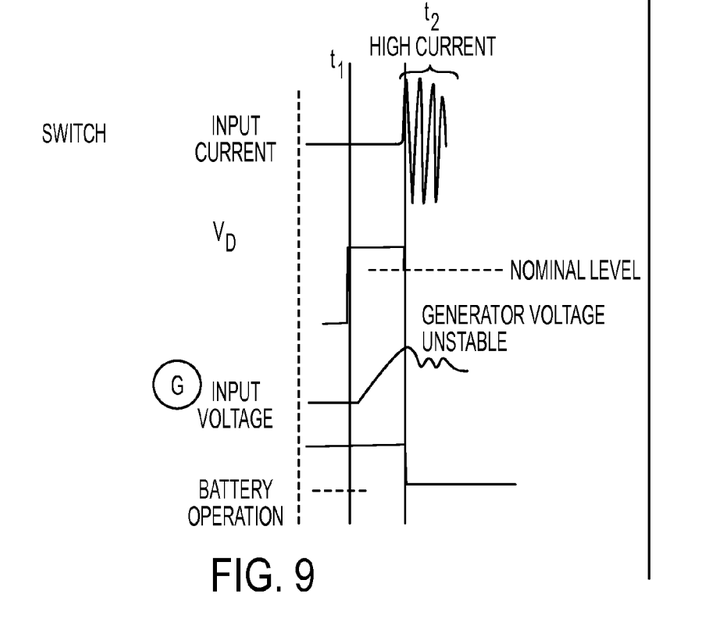
FIG. 9 is a timing diagram of currents and voltages according to the second embodiment.

FIG. 9 shows a timing diagram according to the second embodiment of the uninterruptable power supply as shown in FIG. 8. As shown in FIG. 9, at time $t<t_1$, there is no input current from the generator 2, the power bus voltage 15 is at a nominal level due to the power being supplied from batteries 20. At time $t_1$, the generator voltage begins to rise in order. At time $t_2$, the generator 2 voltage has reached its maximum and battery power is turned off.

As shown in FIG. 9, at time $t_2$, there is a rush of input current from generator 2 and the input voltage shows a slight oscillation. However, the voltage and current oscillation is dampened due to the input filter circuit 5. Thus, the voltage on power bus 15 can quickly stabilize allowing a smooth transition of power from batteries 20 to generator 2.

Figure 10:
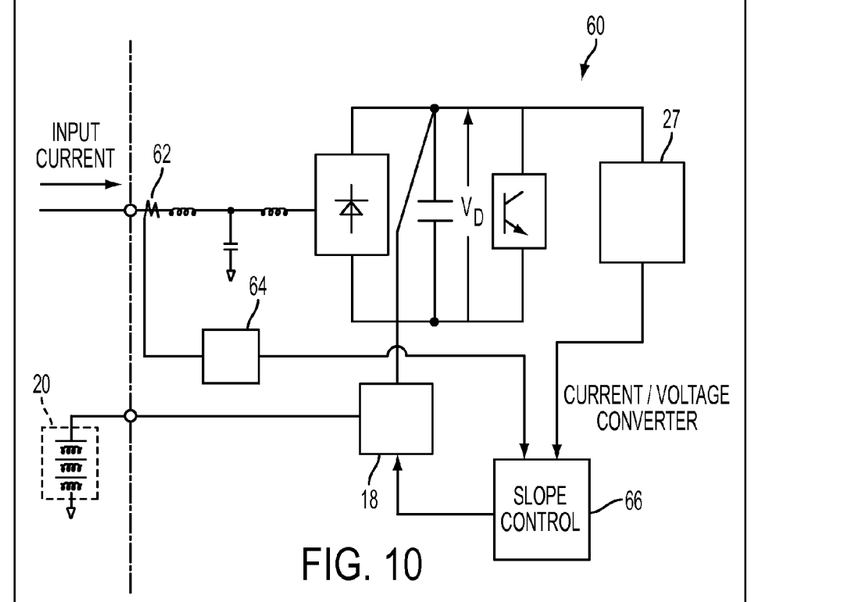
FIG. 10 is a schematic of an uninterruptable power supply according to a third embodiment.

FIG. 10 shows a third embodiment. The embodiment shown comprises a current transducer (CT) 62, a current/voltage converter 64, a voltage boost circuit 18, a slope control circuit 66 and a voltage sensor circuit 27.

CT 62 is located at the input of the commercial and generator power sources. The output of CT 64 is connected to slope controller 66. If the input current reaches a certain level, the slope controller 66 changes the voltage slope to adjust the input current level accordingly. By using this method, the transfer time between battery and AC line mode is minimized and an in-rush current from the generator 2 is minimized.

Figure 11:
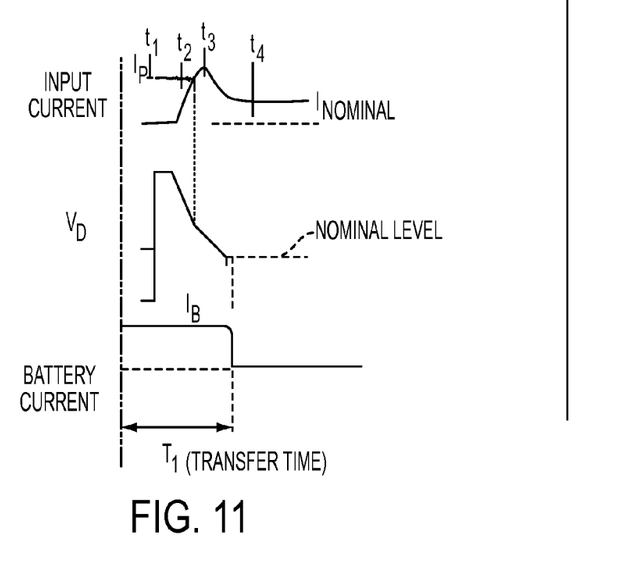
FIG. 11 is a timing diagram of currents and voltages of the uninterruptable power supply according to the third embodiment.

FIG. 11 shows a timing diagram according to a third embodiment of the uninterruptable power supply. As shown in FIG. 11, at time $t<t_1$, battery power is powering the UPS 60. Then, at time $t_1$, power bus 15 voltage is boosted up beyond the nominal voltage level and held at this level until time $t_2$. Then, at time $t_2$, the input current from the generator 2 begins to flow into UPS 60.

At time $t_2<t<t_3$, the input current from generator 2 slowly increases until it reaches at maximum. Concurrently, the power bus 15 voltage ramps down. At time $t_3<t<t_4$, the input current from generator 2 approaches the nominal input current level and the power bus 15 voltage approaches the nominal voltage level. At time $t_4$, the input current from generator 2 has stabilized at its nominal level and the power bus 15 voltage has also stabilized at is nominal level. At this point, the UPS 60 stops drawing energy from the batteries 20 and solely relies on generator 2 input.

Figure 12:
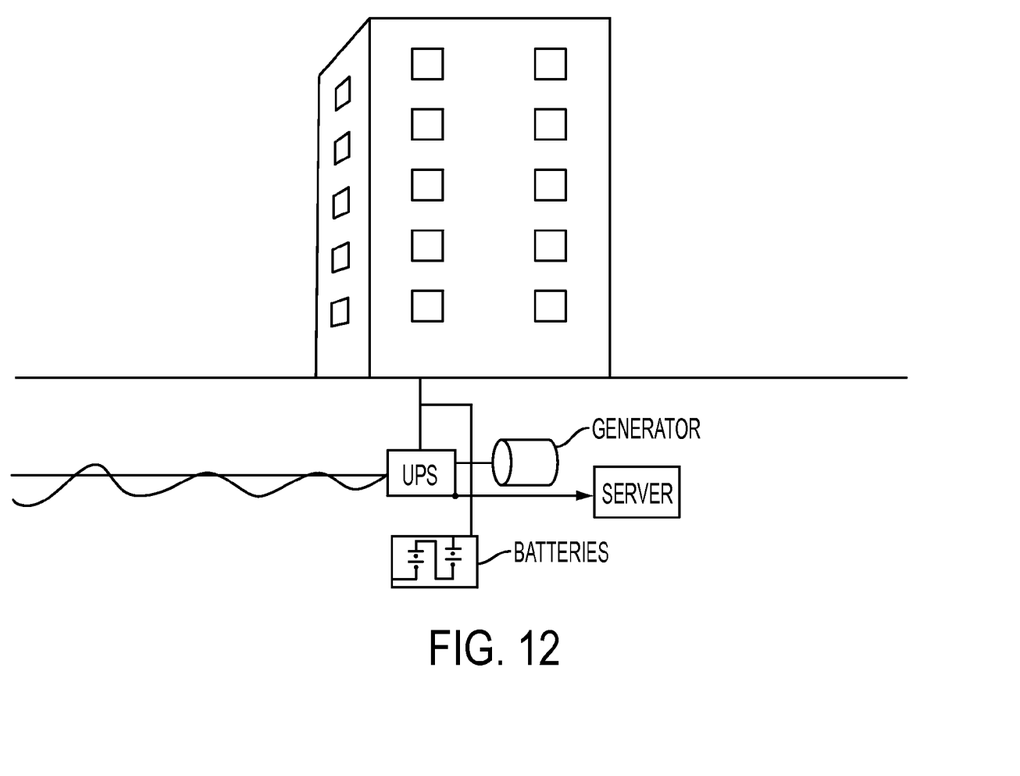
FIG. 12 is a system level drawing of a UPS connected to a building according to an embodiment.

FIG. 12 shows an example of a UPS connected to and powering a building. The UPS is also connected to a bank of batteries and a commercial AC power supply.

While embodiments of the present disclosure have been particularly shown and described with reference to exemplary embodiments thereof, it will be understood by those of ordinary skill in the art that various changes in form and details may be made therein without departing from the spirit and scope of the present invention as defined by the following claims.

I claim:

1. An uninterruptable power supply comprising:
an input terminal and an output terminal;
a main switch connected to the input terminal;
an input filter circuit connected to the main switch;
a rectifier circuit connected to the input filter circuit;
a main capacitor connected to the rectifier circuit;
an inverting device connected to the capacitor and the output terminal;
a voltage boost circuit connected to the capacitor and a battery input terminal;
a slope control circuit connected to the voltage boost circuit;
a slope selection circuit connected to the slope control circuit; and
a control board connected to the slope selection circuit; wherein
the control board has a central processing unit and memory.

2. The uninterruptible power supply according to claim 1, wherein a function of said slope control circuit and slope selection circuit is carried out by the central processing unit.

3. The uninterruptible power supply according to claim 1, wherein said slope control circuit and slope selection circuit are implemented using hardware.

4. The uninterruptible power supply according to claim 2, wherein the slope selection circuit outputs a desired slope to the slope control circuit.

5. The uninterruptible power supply according to claim 4, further comprising:
a voltage detection circuit detecting a bus voltage and outputting the detected bus voltage to the slope control circuit.

6. The uninterruptible power supply according to claim 5, wherein said slope control circuit receives slope selection data from the slope selection circuit and compares this data with the bus voltage and outputs a slope control signal to the voltage boost circuit.

7. The uninterruptible power supply according to claim 1, wherein the slope selection circuit includes predefined voltage slopes.

8. The uninterruptible power supply according to claim 7, wherein the predefined voltage slope is a linear slope.

9. The uninterruptible power supply according to claim 7, wherein the predefined voltage slope is an exponential slope.

10. An uninterruptable power supply comprising:
an input terminal and an output terminal,
a main switch connected to the input terminal,
an input filter circuit connected to the main switch,
a rectifier circuit connected to the input filter circuit,
a main capacitor connected to the rectifier circuit,
a switching device connected to the capacitor and the output terminal,
a voltage boost circuit connected to the capacitor and a battery input terminal,
wherein the input filter circuit includes an inductor circuit, a second switch connected to said inductor circuit and a capacitor connected between a ground and the second switch.

11. An uninterruptable power supply comprising:
an input terminal and an output terminal,
a current transducer connected to the input terminal,
a main switch connected to the current transducer,
an input filter circuit connected to the main switch,
a rectifier circuit connected to the input filter circuit,
a main capacitor connected to the rectifier circuit,
a switching device connected to the capacitor and the output terminal,
a voltage boost circuit connected to the capacitor and a battery input terminal,
a slope control circuit connected to the voltage boost circuit,
a current/voltage converter connected in between the current transducer and the slope control circuit.

* * * * *